US009140786B2

(12) United States Patent
Shipley et al.

(10) Patent No.: US 9,140,786 B2
(45) Date of Patent: Sep. 22, 2015

(54) METHOD AND SYSTEM USING RADIOMETRIC VOLUMETRIC DATA FOR DETECTING OIL COVERED BY ICE

(71) Applicant: HARRIS CORPORATION, Melbourne, FL (US)

(72) Inventors: John Warner Shipley, Sebastian, FL (US); Emile Ganthier, Palm Bay, FL (US); Stephen T Hogue, Melbourne, FL (US); Sean Freeman, Indialantic, FL (US); Gregory Medlin, Melbourne, FL (US); Edward Beadle, Melbourne, FL (US)

(73) Assignee: HARRIS CORPORATION, Melbourne, FL (US)

( * ) Notice: Subject to any disclaimer, the term of this patent is extended or adjusted under 35 U.S.C. 154(b) by 399 days.

(21) Appl. No.: 13/708,315

(22) Filed: Dec. 7, 2012

(65) Prior Publication Data

US 2014/0159938 A1    Jun. 12, 2014

(51) Int. Cl.
*G01S 13/89* (2006.01)
*G01V 3/12* (2006.01)
*G01V 3/17* (2006.01)

(52) U.S. Cl.
CPC . *G01S 13/89* (2013.01); *G01V 3/12* (2013.01); *G01V 3/17* (2013.01)

(58) Field of Classification Search
CPC ........... G01S 13/89; G01S 13/88; G01V 3/17; G01V 3/12; G01K 11/006
USPC ................... 342/22, 27, 53, 90, 188
See application file for complete search history.

(56) References Cited

U.S. PATENT DOCUMENTS

| | | | |
|---|---|---|---|
| 5,672,007 A * | 9/1997 | Brown et al. | 374/7 |
| 5,777,481 A | 7/1998 | Vivekanandan | |
| 6,646,593 B1 * | 11/2003 | Garren | 342/179 |
| 7,259,715 B1 * | 8/2007 | Garren et al. | 342/179 |
| 2008/0297405 A1 * | 12/2008 | Morrison, Jr. et al. | 342/25 F |
| 2011/0181279 A1 | 7/2011 | Srnka et al. | |
| 2013/0099960 A1 * | 4/2013 | Broman et al. | 342/25 A |
| 2014/0159936 A1 * | 6/2014 | Medlin et al. | 342/22 |
| 2014/0159937 A1 * | 6/2014 | Beadle et al. | 342/22 |
| 2014/0159938 A1 * | 6/2014 | Shipley et al. | 342/22 |

FOREIGN PATENT DOCUMENTS

| | | |
|---|---|---|
| CA | 2700749 A1 * | 4/2009 |
| RU | 2207588 C2 * | 6/2003 |

(Continued)

OTHER PUBLICATIONS

Dickens et al., "Remote sensing technology. Review and screening", JIP Oil in Ice, No. 22, Nov. 2009, pp. 1-40.

(Continued)

*Primary Examiner* — John B Sotomayor
(74) *Attorney, Agent, or Firm* — Allen, Dyer, Doppelt, Milbrath & Gilchrist, P.A.

(57) ABSTRACT

A method for detecting an oil mass covered by ice includes collecting radiometric data different frequencies, corresponding to respective different depths into the ice, using at least one airborne platform moved about a search area above the ice so that the radiometric data defines radiometric volumetric data. The radiometric volumetric data is processed to thereby detect an oil mass covered by the ice.

26 Claims, 15 Drawing Sheets

(56) References Cited

FOREIGN PATENT DOCUMENTS

WO    WO 2009045670 A1 *   4/2009   ............. G01V 3/175
WO    WO 2010052530 A1 *   5/2010

OTHER PUBLICATIONS

Fingas et al., "A review of the status of advanced technologies for the detection of oil in and with ice", Spill Science & Technology Bulletin, vol. 6, No. 5-6, Oct. 2000, pp. 295-302.

Hollinger et al., "Oil spills: Measurements of their distributions and volumes by multifrequency microwave radiometry", Science, vol. 181, Jan. 1973, pp. 54-56.

Hover, "USCG R&D center conducts research in tactical oil spill surveillance technology", Proceedings of the Marine Safety Council, Jan. 1997, pp. 1-6.

Pelyushenko, "Microwave radiometer system for the detection of oil slicks", Spill Science & Technology Bulletin, vol. 2, No. 4, Jan. 1995, pp. 249-254.

Trieschmann et al., "A multiple remote sensor system for the aerial surveillance of the North Sea and Baltic Sea", Fifth International Airborne Remote Sensing Conference, Sep. 2001, pp. 1-9.

Potter et al. "Spill Response in the Arctic Offshore" Prepared for Teh American Petroleum Institute and the Joint Industry Programme on Oil Spill Recovery in Ice; Feb. 2, 2012.

Jha et al. "Advances in Remote Sensing for Oil Spill Disaster Management: State-of-the-Art Sensors Technology for Oil Spill Surveillance" Sensors 2008; 8, 236-255.

Dickins "Detecting Spills in Ice Covered Waters" U.S. Coast Guard Arctic Response Workshop; Anchorage; Apr. 23, 2010.

Dickins et al. Remote Sensing for the Oil in Ice Joint Industry Program 2007-2009.

Mansor et al. "Oil Spill Detection and Monitoring From Satellite Image" 2002.

Scheirmeier "The Great Arctic Oil Race Begins" News in Focus: Feb. 2, 2012; vol. 482 pp. 13-14.

La Belle-Hamer "UAF Arctic Oil Spill Program" Northern Waters Task Force, Nov. 2011.

\* cited by examiner

METHOD AND SYSTEM USING RADIOMETRIC VOLUMETRIC DATA FOR DETECTING OIL COVERED BY ICE

FIELD OF THE INVENTION

The present invention relates to the field of oil resources, and more particularly, to a method and system for detecting an oil mass covered by ice.

BACKGROUND OF THE INVENTION

As the world's demand for fossil fuels increases, energy companies find themselves pursuing hydrocarbon resources in more remote areas of the world. Such pursuits often take place in harsh, offshore conditions. In recent years, drilling and production activities have been started in the Arctic regions.

Spill detection and mapping may be particularly important for Arctic spills as oil may be hidden from view under snow and ice during periods of almost total darkness. Close to 24 hours of daylight in the spring and summer months facilitates monitoring oil spilled during the break-up and open water periods, but periods of fog and a low cloud ceiling remain as serious impediments. During freeze-up and through much of the winter, long periods of darkness and multiple oil/ice scenarios add to the challenges of detection, mapping and tracking oil in ice.

One approach for detecting an oil mass trapped beneath or within a solid ice sheet or on the ice surface under snow is based on the use of a low level airborne ground penetrating radar (GPR). In a paper titled "Remote Sensing for the Oil in Ice Joint Industry Program 2007-2009" by Dickins et al., a commercially available GPR system in the 500 MHz to 1 GHz frequency range is described that may be operated both from the ice surface and at low altitude from a helicopter to detect oil layers in the 1-3 cm range trapped in relatively smooth ice.

GPR is sensitive to the presence of oil in the snow pack over a broad range of snow densities and oil types. Oil located at the base of the snow tends to reduce the impedance contrast with the underlying ice or soil substrate resulting in anomalously low amplitude radar reflections and thereby enhances the prospects for detection with GPR. Sea ice, on the other hand, has a much higher electrical conductivity that varies substantially both laterally and vertically and can exhibit a high degree of anisotropy due to preferred crystal alignment. GPR may provide reliable thickness measurements for low salinity ice, but significant signal attenuation occurs for high-salinity first-year ice. Consequently, the problem of detecting an oil mass is simpler to formulate for dry snow than it is for sea ice since snow has a relatively isotropic structure and low conductivity.

Direct spill detection from SAR satellites and airborne SLAR/SAR systems is relatively straightforward for large spills in very open drift ice. However, detection of an oil mass covered by ice is much more difficult. Moreover, during freeze-up in fall and early winter, any detection of oil among ice with SAR/SLAR airborne or satellite sensors may be complicated by the presence of grease ice. Grease ice is the earliest smooth stage of ice crystals at the water surface. The presence of grease or new ice in conjunction with an oil spill on the water will produce close to identical signatures in the radar imagery, making detection of an oil slick difficult or impossible.

Other technologies that may be used to detect Arctic oil spills or leakages include forward looking infrared (FLIR) systems, SONAR systems, and hyperspectral imaging systems. In some cases, trained dogs may be used to reliably detect oil near the surface of the ice. A thickness of the ice in Arctic regions, for example, may vary from a few centimeters to 5 meters. While these other technologies may work when the oil is on or near the surface of the ice, they may not be very effective in detecting an oil mass covered by thick ice.

Yet another approach for detecting an oil mass under ice is based on nuclear magnetic resonance (NMR), as disclosed in U.S. Published Patent Application No. 2011/0181279. In this approach, a volume of substances is located under the surface, wherein at least a portion of the volume of substances is within a static magnetic field. At least one radio-frequency excitation pulse is transmitted from a remote location above the volume of substances to generate a nuclear magnetic resonance (NMR) signal from the volume of substances. From the remote location, the NMR signal from the volume of substances is detected. The detected NMR signal is processed to determine whether the volume of substances includes the liquid. Even in view of NMR, there is still a need to improve upon the detection of an oil mass covered by ice.

SUMMARY OF THE INVENTION

In view of the foregoing background, it is therefore an object of the present invention to provide a method and system that reliably detects an oil mass covered by ice.

This and other objects, features, and advantages in accordance with the present invention are provided by a method for detecting an oil mass covered by ice comprising collecting radiometric data at a plurality of different frequencies, corresponding to respective different depths into the ice, using at least one airborne platform moved about a search area above the ice so that the radiometric data defines radiometric volumetric data. The radiometric volumetric data may be processed to thereby detect an oil mass covered by the ice.

Multi-band radiometry advantageously takes advantage of energy differences in RF signatures of black-body radiations with respect to an oil mass and ice to reliably detect an oil mass covered by ice. The radiometric data collected at the different frequencies defines a combined x-y-depth profile that may advantageously provide a 3-dimensional visualization of the oil mass covered by the ice.

In some embodiments, the collecting may include passively collecting the radiometric volumetric data. The different frequencies may extend over a range of 30 MHz to 8 GHz, for example.

In other embodiments, the method may further include exposing the search area to electromagnetic (EM) radiation so that the collecting includes actively collecting the radiometric volumetric data. This may include exposing the search area to EM radiation having a frequency resonant with the oil. For example, the EM radiation may have a frequency in a range of 8 MHz to 30 MHz.

The collecting may include collecting the radiometric data over a predetermined dwell time for a given location. This advantageously allows a sufficient energy level to be received so at to more accurately process the radiometric volumetric data.

The processing may include processing based upon at least one polarization characteristic of the radiometric volumetric data.

The method may further include collecting the radiometric volumetric data for the search area at a plurality of different times, and wherein the processing may further include using change detection based upon the plurality of different times to detect the oil mass covered by the ice.

The search area may include a predetermined area around an oil extraction site. Alternatively or additionally, the search area may include a predetermined area around an oil pipeline site. In addition, the at least one airborne platform may include at least one unmanned airborne platform.

Another aspect is directed to a system for detecting an oil mass covered by ice comprising at least one airborne platform configured to collect radiometric data at a plurality of different frequencies, corresponding to respective different depths into the ice, as the at least one airborne platform moves about a search area above the ice so that the radiometric data defines radiometric volumetric data. A processor and a memory coupled thereto may process the radiometric volumetric data to thereby detect an oil mass covered by the ice.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicated similar elements in alternative embodiments.

In Arctic regions, for example, a thickness of ice may vary from a few centimeters to 5 meters. The area to be searched when looking for a leaked oil mass is typically within a predetermined area associated with an oil extraction site or an oil pipeline site. The oil extraction site may be an oil platform within the Arctic waters, and the oil pipeline site may extend away from the oil platform to deliver recovered crude oil. As an example, the search area is about 10 $km^2$ surrounding the oil platform and the oil pipeline site. The search area is to be frequently searched to look for changes indicative of a pocket of oil forming under or trapped within a layer of ice, in other words, the area is searched to detect a mass of oil covered by ice. Those of skill in the art will recognize that the oil mass will also be detected on the surface of the snow or ice; however, an oil mass covered by ice presents the more difficult detection challenge.

In addition, since the characteristics of ice changes as a function of time and temperature, it may be desirable to establish a baseline of the environmental characteristics within the search area. Since the thickness of ice and its salinity varies throughout the season, this has an effect on the penetration depth of the radar used to collect the environmental characteristics.

One aspect of detecting an oil mass covered by ice is based on the use of polarimetric volumetric radar data. As will be discussed in greater detail below, polarimetric volumetric radar data advantageously allows an oil mass to be reliably detected within the search area when covered by ice. Once an oil mass is detected, its size and volume may be determined based on the polarimetric volumetric radar data.

Figure 1:
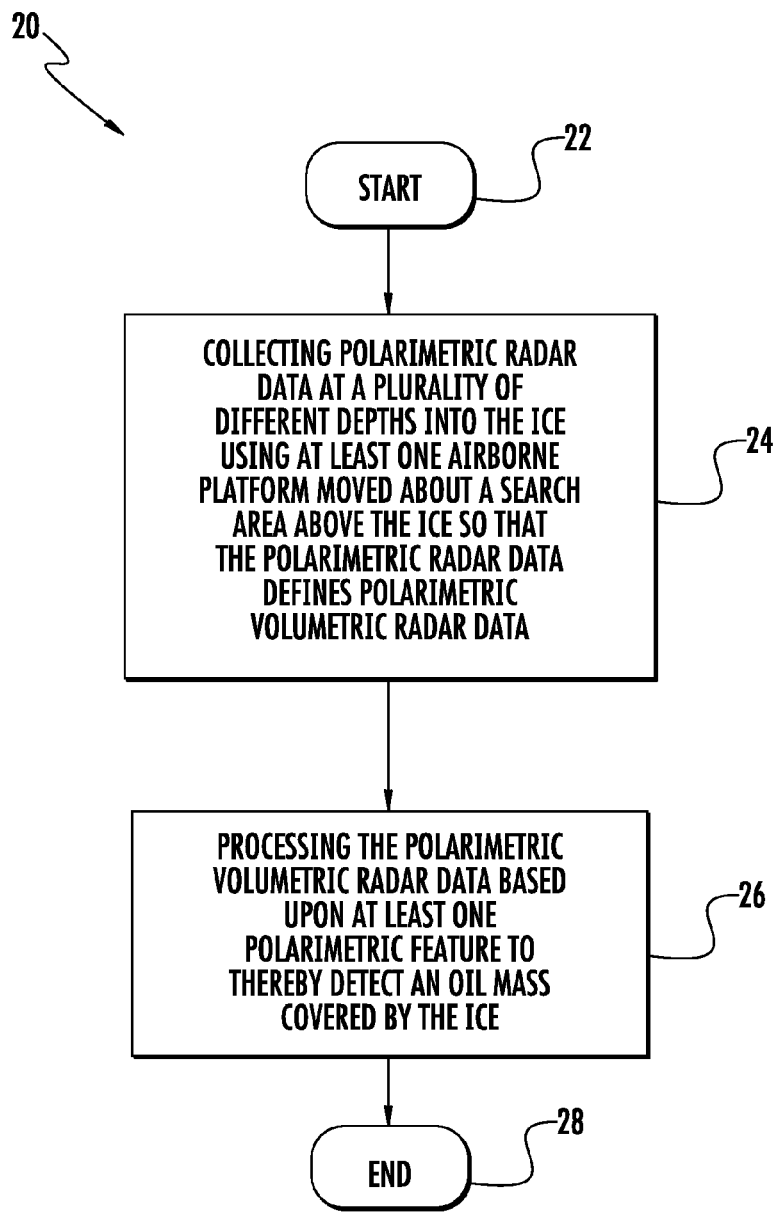
FIG. 1 is a flow chart for a method for detecting an oil mass covered by ice using polarimetric radar data in accordance with the present invention.

Referring initially to the flowchart 20 in FIG. 1, a method for detecting an oil mass covered by ice includes, from the start (Block 22), collecting polarimetric radar data at different depths into the ice at Block 24 using at least one airborne platform moved about the search area above the ice so that the polarimetric radar data defines polarimetric volumetric radar data. The polarimetric volumetric radar data is processed at Block 26 based upon at least one polarimetric feature to thereby detect an oil mass covered by the ice. The method ends at Block 28.

Figure 2:
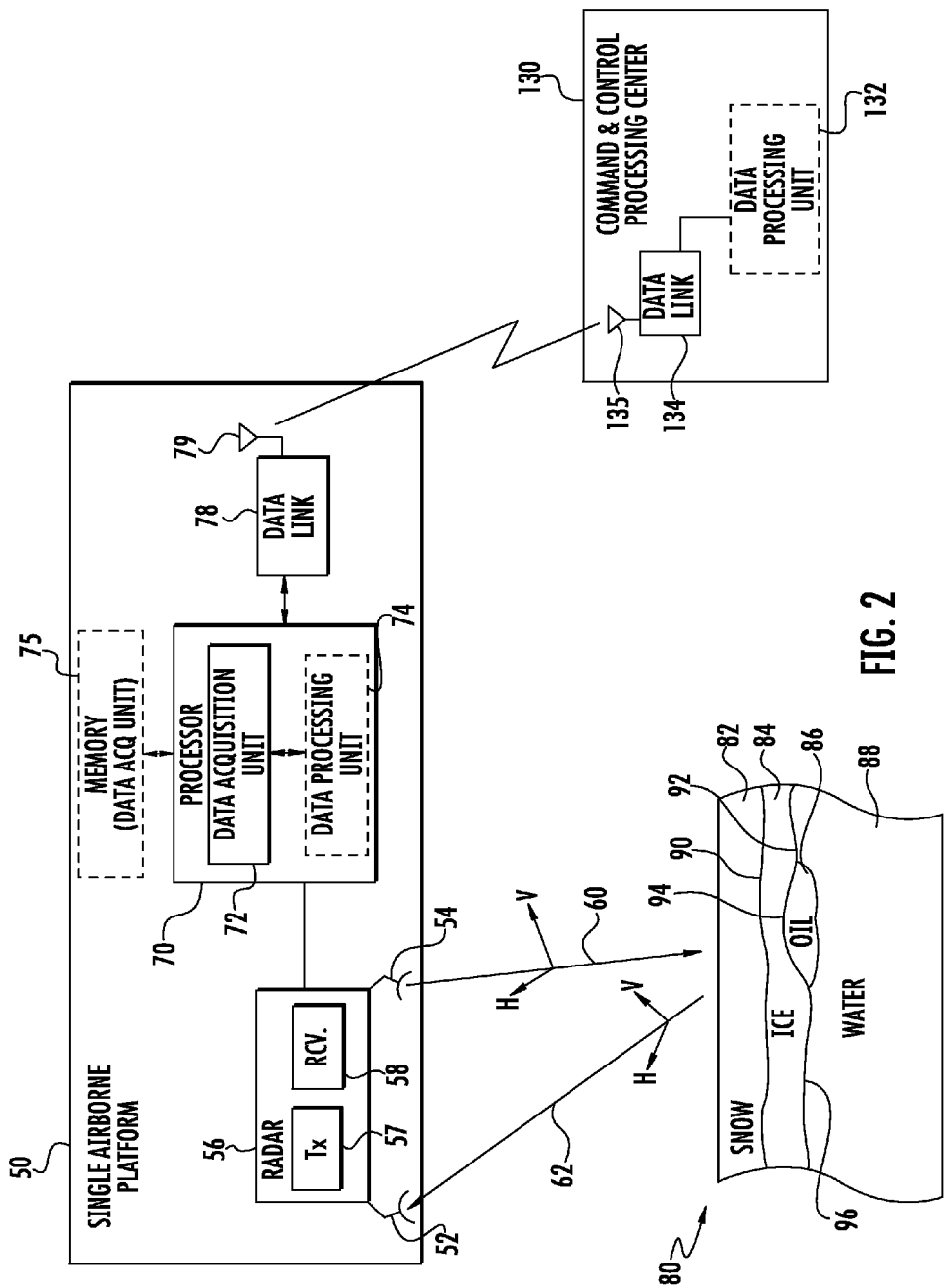
FIG. 2 is a schematic block diagram of a back scatter system for detecting an oil mass covered by ice using polarimetric radar data in accordance with the present invention.

In one embodiment, the at least one airborne platform is a single airborne platform 50 as illustrated in FIG. 2. In greater detail, a corresponding method of detecting an oil mass 86 covered by ice 84 using the single airborne platform 50 is now explained with additional reference to the flow chart 30 in FIG. 3. From the start (Block 32), the single airborne platform 50 is moved about a search area 80 at Block 34. The single airborne platform 50 includes spaced apart transmit and receive antennas 52, 54. The spaced apart transmit and receive antennas 52, 54 allow for bi-static operation of a radar 56 carried by the single airborne platform 50. The single airborne platform 50 is about 100 feet above the ice 84, for example.

A transmitter 57 within the radar 56 transmits polarized signals 60 to the search area 80 at Block 36. The polarized signals 60 include horizontal polarization and vertical polarization, which are orthogonal to one another. In lieu of or in additional to the horizontal and vertical polarizations, left-hand and right-hand circular polarizations may be used, which are also orthogonal to one another.

Figure 4:
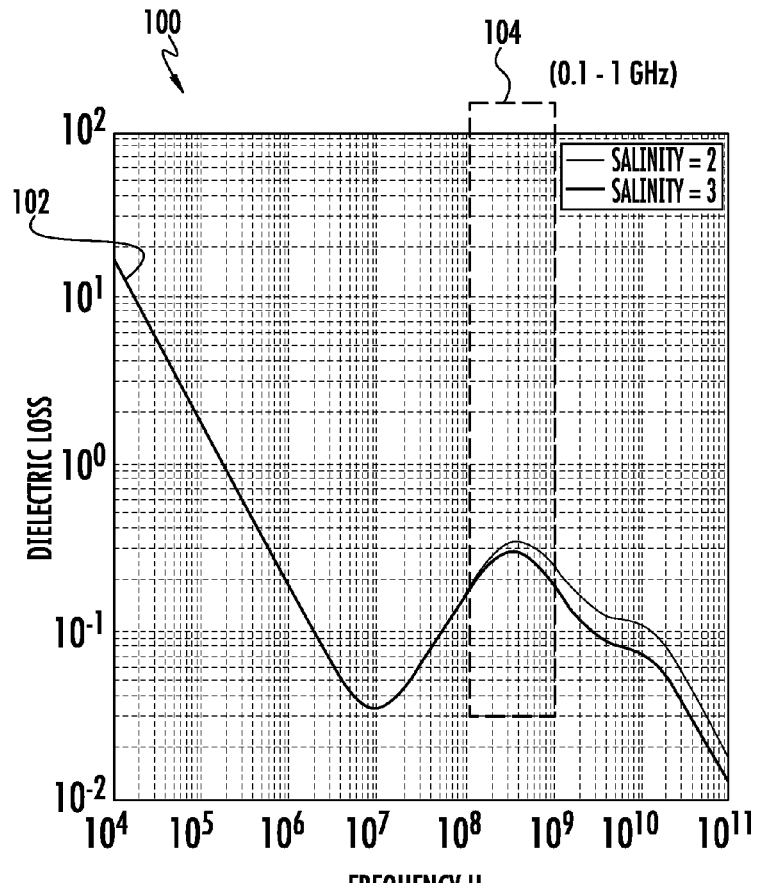
FIG. 4 is a plot of dielectric loss for ice as a function of frequency in accordance with the present invention.

A desired operating frequency of the radar 56 may be selected based on antenna size and penetration depth of the polarized signals into the ice 84. As readily understood by those skilled in the art, ice acts as an insulator and a dielectric loss of the ice varies with respect to frequency. As illustrated by line 102 in the graph 100 provided in FIG. 4, the dielectric loss of the ice 84 increases as the frequency is lowered to the 10 MHz range. Within the 0.1-1.0 GHz frequency range, as highlighted by box 104, a balance between dielectric loss and frequency is obtained. In the illustrated example, the operating frequency of the radar 56 is 0.1 GHz.

A receiver 58 within the radar 56 is operated to receive reflected polarized signals 62 from the search area 80 at Block 38 based on the transmitted polarization signals 60 being reflected from the search area. The return signals 62 provide a polarimetric depth slice based on different measurements.

Figure 5:
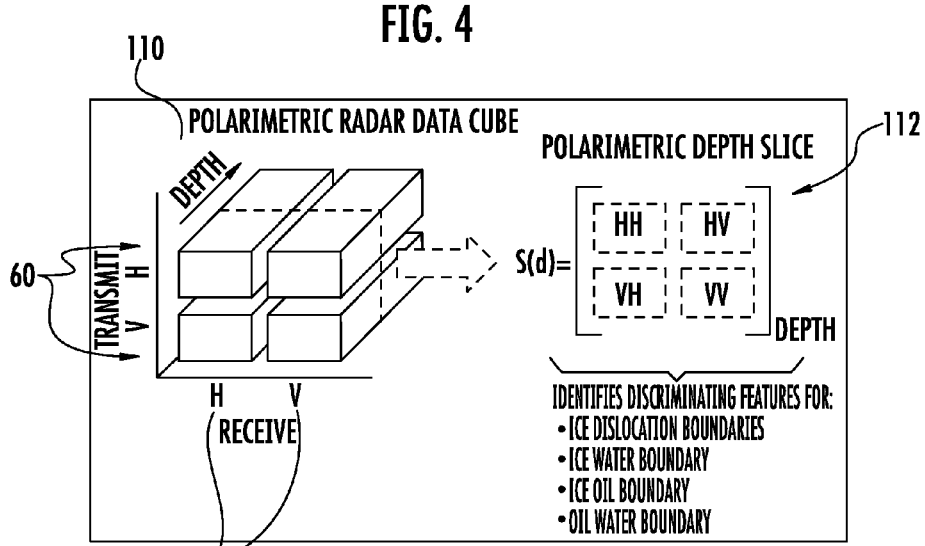
FIG. 5 is a schematic diagram representing a polarimetric radar data cube used to provide a scattering matrix defining a polarimetric depth slice in accordance with the present invention.

Referring now to FIG. 5, an illustrated polarimetric radar data cube 110 is defined based on the radar transmitter 57 transmitting vertically polarized signals and horizontally polarized signals 60. The radar receiver 58 receives both horizontal and vertically polarized signals 62 on corresponding horizontally and vertically polarized antennas.

Still referring to FIG. 5, given these four measurements, a polarimetric depth slice 112 represented by a scattering matrix S(d) is obtained. The polarimetric depth slice 112 corresponds to the polarimetric volumetric radar data being provided at Block 40 to a data acquisition unit 72 carried by the airborne platform 50. The illustrated data acquisition unit 72 is included within a processor 70 coupled to the radar 56. Alternatively, the data acquisition unit 72 may be configured as a memory 75 external the processor 70 within the single airborne platform 50. Of course, the processor may also include memory embedded on the same integrated circuit as the processor circuitry.

Each scattering matrix S(d) corresponds to a particular depth. The depth is determined based on a round trip time (RTT) of a transmitted polarization signal 60 being reflected 62 and received by the radar receiver 58. Since distance=rate*time, the longer the radar receiver 58 waits to receive the return signal, then the greater is the corresponding depth into the ice 84. By adjusting the RTTs, different scattering matrixes S(d) are obtained, where the different scattering matrixes S(d) correspond to different depths into the ice 84. The different scattering matrixes S(d) are stored in the data acquisition unit 72 or memory 75.

The different scattering matrixes S(d) included within the polarimetric radar data are processed by a data processing unit 74 at Block 42. The data processing unit 74 may be within the processor 70 carried by the single airborne platform 50, or alternatively, the data processing unit may be external the single airborne platform 50. In the illustrated embodiment, the data processing unit 132 is located at a remote command and control processing center 130.

Polarimetric volumetric radar data from the data acquisition unit 72 may be provided to the data processing unit 132 at the command and control processing center 130 via a data link 78. The data link 78 includes an antenna 79 coupled thereto. The command and control processing center 130 includes a corresponding data link 134 with an antenna 135 coupled thereto. Alternatively, the polarimetric volumetric radar data may be on a removable data storage medium that is physically inserted into the data processing unit 132 at the command and control processing center 130.

When processing the polarimetric volumetric radar data, polarization profiles are used to identify boundaries of different layer or strata interfaces. The layers making up the search area 80 are snow 82, ice 84, an oil mass 86 and water 88. The different layer interfaces thus include a snow-to-ice interface 90, an ice-to-water interface 92, an ice-to-oil interface 94, and an oil-to-water interface 96. Each one of these interfaces provides a different polarization profile which can then be used to identify the particular type of interface. By reliably determining the different types of interfaces, when an ice-to-oil interface 94 or an oil-to-water interface 96 is detected under the ice 84, then a reliable determination can be made that an oil mass 86 has been detected.

In one embodiment, the radar 56 operates based on pulses. To build up sufficient energy on a target within the search area 80, a longer pulse width may be used or multiple pulses are used. A pulse may be an impulse or pulse-compression with an appropriate equalizer. In another embodiment, the radar 56 operates based on a frequency modulated, continuous wave (FMCW) waveform. An FMCW waveform is frequency agile and adaptive, as readily appreciated by those skilled in the art.

RF sounding may be used to adjust an operating frequency of the radar transmitter 57 based on the environmental conditions in the search area 80. RF sounding allows characteristics of the ice 84 to be determined at Block 44. Based on the determined characteristics of the ice 84, such as thickness and salinity, the operating frequency of the transmitter is adjusted at Block 46.

RF sounding involves transmitting a signal to the ice, and based on a return signal, the thickness of the ice may be determined. Since ice acts as an insulator, as illustrated by the graph 100 in FIG. 4, the operating frequency may be adjusted up or down depending on the thickness of the ice. As an alternative to RF sounding, ice characteristics may be determined based on preexisting geological surveys, for example.

If the four different measurements within the different scattering matrixes S(d) are not strong enough to determine the different polarization profiles, then other polarimetric features may be used. For example, the other polarimetric features are provided in TABLE 1 below, and include the following:

TABLE 1

| # | Feature |
|---|---|
| 1 | Entropy H |
| 2 | Anisotropy A |
| 3 | Polarimetric span |
| 4 | Mean scattering angle α |
| 5 | Alternative entropy $A_{12}$ |
| 6 | Standard deviation of CDP |
| 7 | Conformity coefficient μ |
| 8 | Co-pol correlation coefficient $\rho_{co}$ |
| 9 | Combined feature F |
| 10 | Circular polarization coherence CPC |
| 11 | Bragg likelihood ratio |

The scattering matrix S(d) may first be represented as the following T matrix:

$$T = \frac{1}{2}\begin{bmatrix} \langle|S_{HH}+S_{VV}|^2\rangle & \langle(S_{HH}+S_{VV})(S_{HH}-S_{VV})^*\rangle & 2\langle(S_{HH}+S_{VV})S_{HV}^*\rangle \\ \langle(S_{HH}-S_{VV})(S_{HH}+S_{VV})^*\rangle & \langle|S_{HH}-S_{VV}|^2\rangle & 2\langle(S_{HH}-S_{VV})S_{HV}^*\rangle \\ 2\langle S_{HV}(S_{HH}+S_{VV})^*\rangle & 2\langle S_{HV}(S_{HH}-S_{VV})^*\rangle & 4\langle|S_{HV}|^2\rangle \end{bmatrix}$$

$$p_i = \frac{\lambda_i}{\sum_{i=1}^{3}\lambda_j}$$

where the different T matrixes correspond to different polarimetric depth slices 112, as illustrated in FIG. 5. One or more of the polarimetric features in TABLE 1 may be used for determining the different polarization profiles.

In one such combination, an eigenvalue decomposition on the T matrixes provides the value $p_i$. The value $p_i$ is then used to determine the entropy H, as follows:

$$H = -\sum_{i=1}^{3} p_i \log_3 p_i$$

$$A = \frac{p_2 - p_3}{p_2 + p_3}$$

To get the anisotropy A, the less dominant eigenvalues $p_2$ and $p_3$ mare used. If the H and A measurements are strong enough, then they may be used to determine the different profile interfaces. However, the if the H and A measurements are weak, then the conformity coefficient may be calculated for using the information in matrix T defining the polarimetric depth slice 112, as follows:

$$\mu = \frac{2(\text{Re}(S_{HH}S_{VV}^*) - |S_{HV}|^2)}{|S_{HH}|^2 + 2|S_{HV}|^2 + |S_{VV}|^2}.$$

Figure 3:
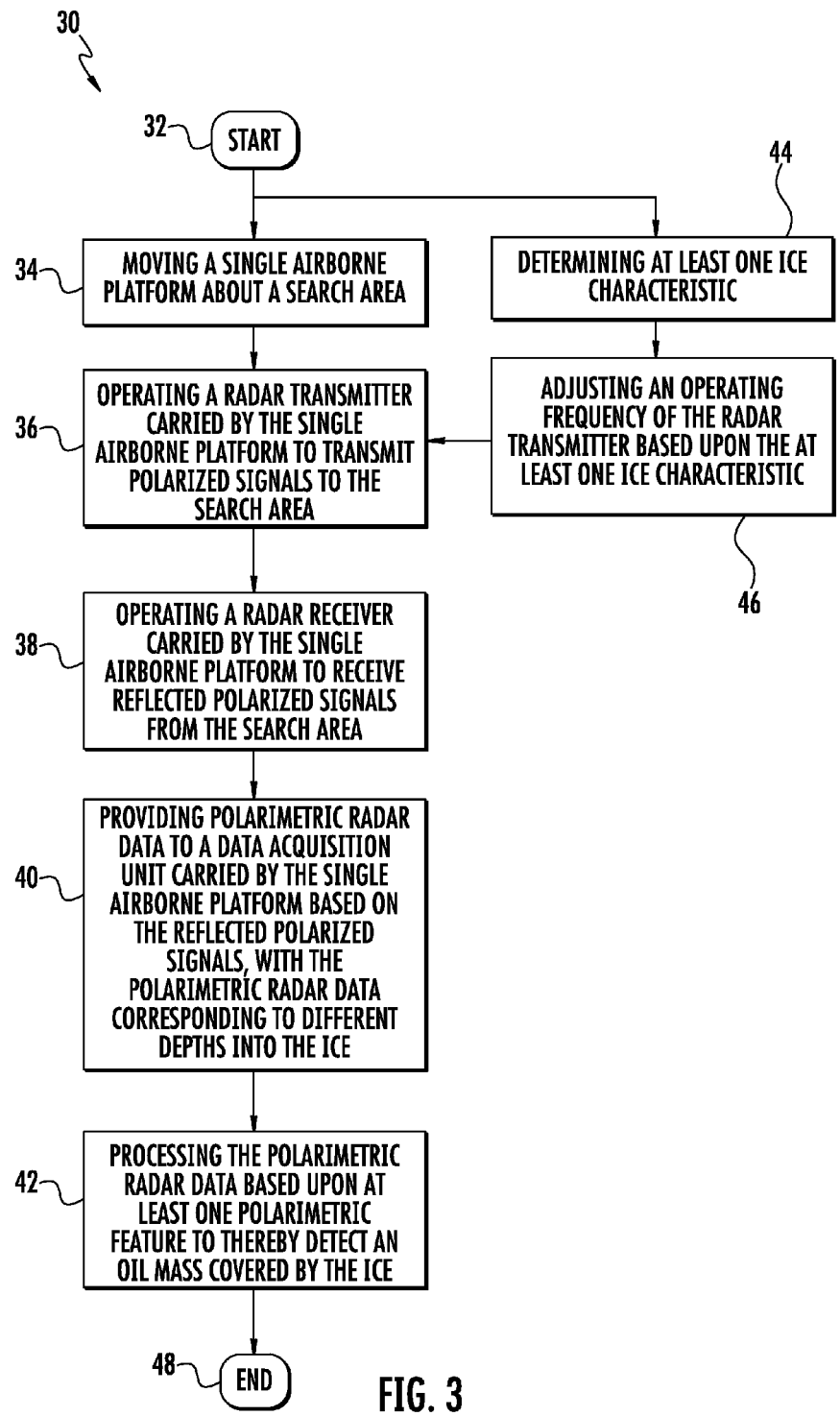
FIG. 3 is a more detailed flow chart illustrating a method for detecting an oil mass under ice using the single airborne platform illustrated in FIG. 2.

Yet other features from TABLE 1 may be used, as readily appreciated by those skilled in the art. The method as illustrated in FIG. 3 ends at Block 48.

The single airborne platform 50 may be piloted by a human, or it may be remote controlled via the data link 134 at the command and control processing center 130. In yet other alternative embodiments, the single airborne platform 50 may be autonomously controlled, such as a lighter-than-air aircraft intended to hover over the search area 80 for extended periods of time.

Figure 6:
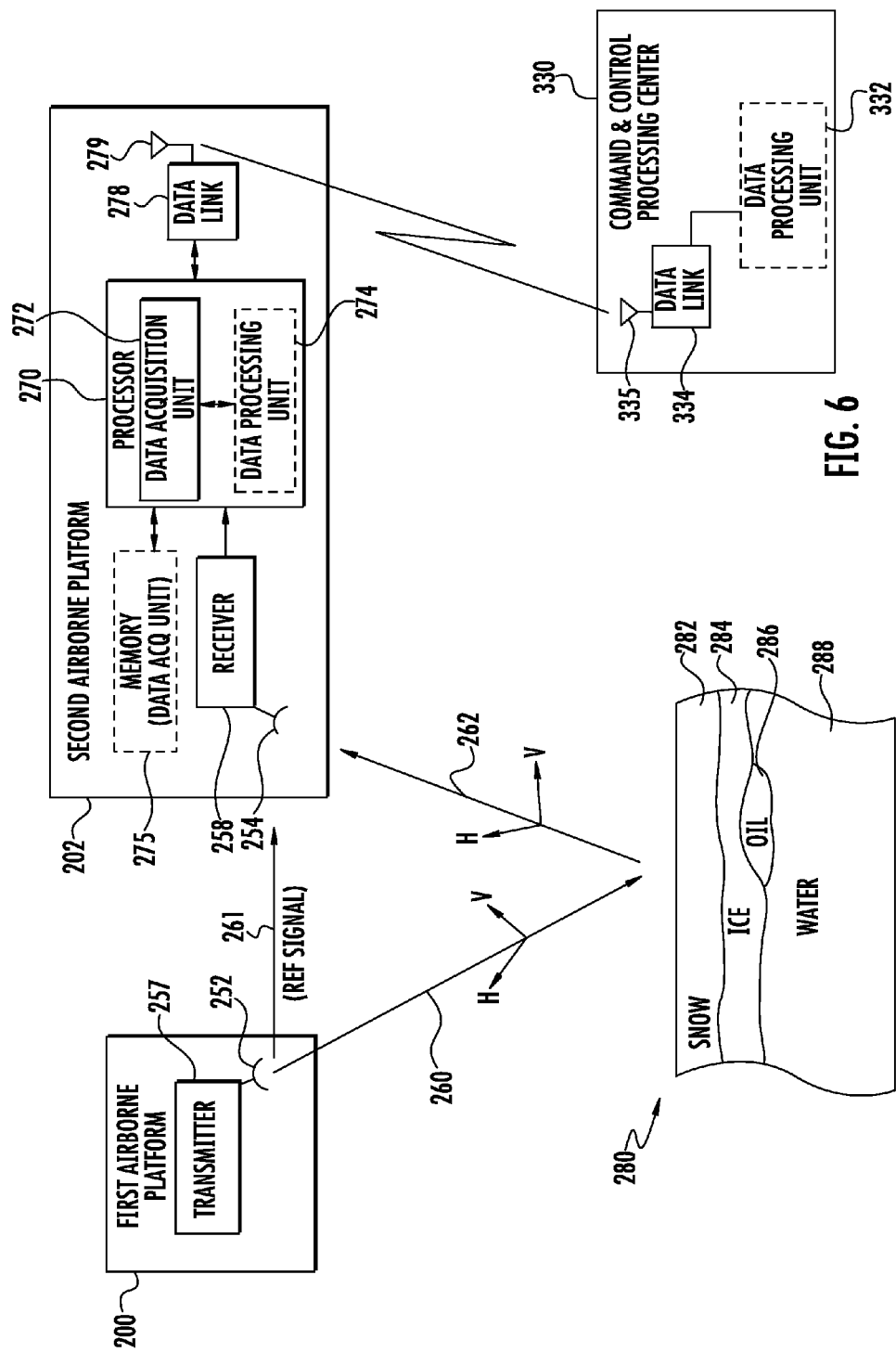
FIG. 6 is a schematic block diagram of a forward scatter system for detecting an oil mass covered by ice using polarimetric radar data in accordance with the present invention.
Figure 7:
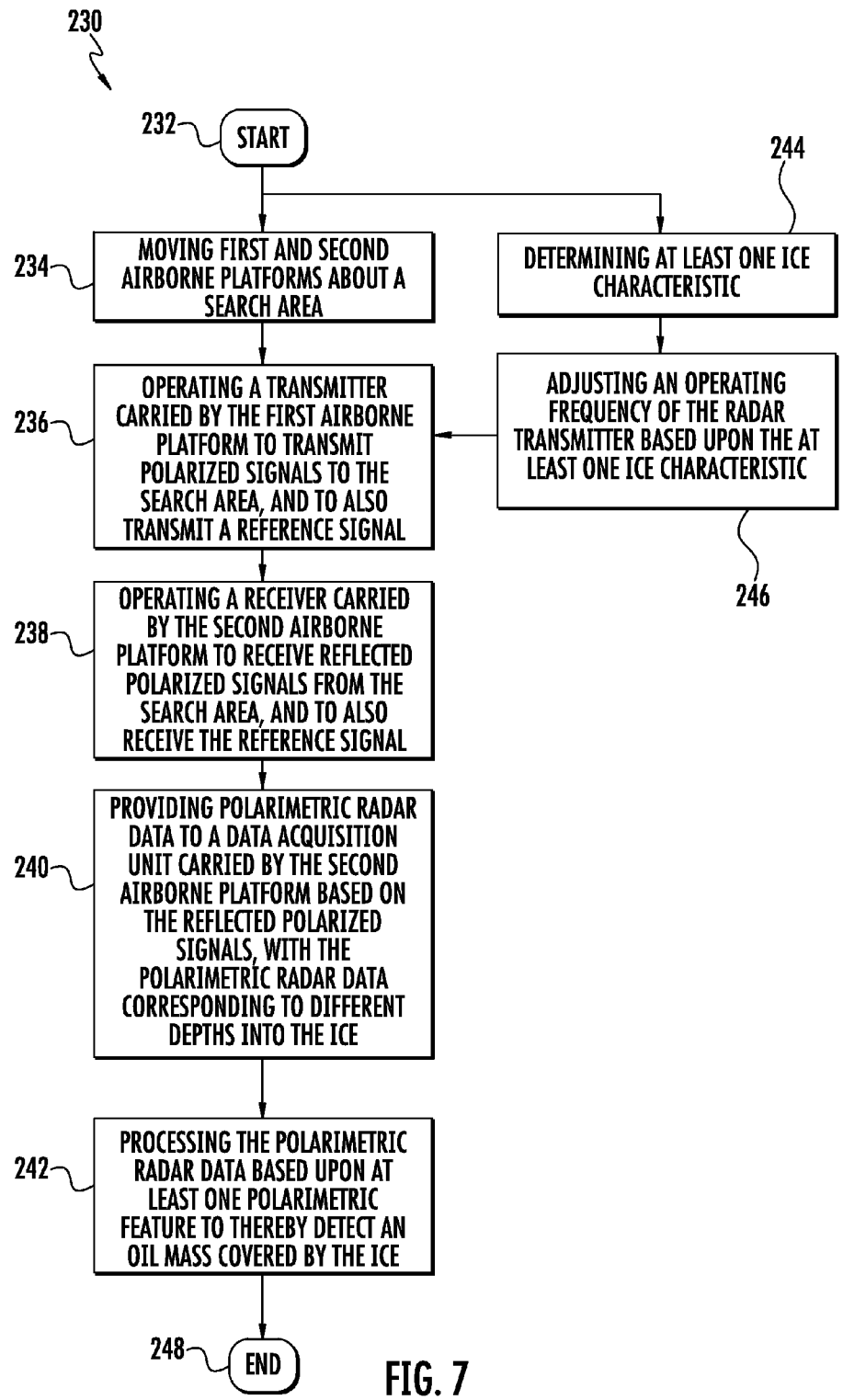
FIG. 7 is a more detailed flow chart illustrating a method for detecting an oil mass under ice using the multiple airborne platforms illustrated in FIG. 6.

As an alternative to a single airborne platform 50 allowing for bi-static operation, multiple airborne platforms 200, 202 may be used allowing for a forward scatter operation, as illustrated in FIG. 6. In greater detail, a corresponding method of detecting an oil mass 286 covered by ice 284 using first and second airborne platforms 200, 202 is now described with reference to the flow chart 230 in FIG. 7.

The first airborne platform 200 includes a transmitter 257 and a transmit antenna 252 coupled thereto. The second airborne platform 202 includes a receiver 258 and a receive antenna 254 coupled thereto. As an example, the first and second airborne platforms 200, 202 may be about 100 feet above the ice 284, and may be separated by about 3 degrees off normal.

From the start (Block 232), the first and second airborne platforms 200, 202 are moved about a search area 280 at Block 234. The transmitter 257 in the first airborne platform 200 is operated to transit polarized signals 260 to the search area 280 at Block 236, and to also transmit a reference signal 261 to the receiver 258 in the second airborne platform 202.

The receiver 258 in the second airborne platform 202 is operated at Block 238 to receive reflected polarized signals 262 from the search area 280 based on the transmitted polarization signals 260 being reflected from the search area 280, and to also receive the reference signal 261 from the first airborne platform 200. The reference signal 261 corresponds to a timing signal so that the receiver 258 in the second airborne platform 202 is coordinated with the transmitter 257 in the first airborne platform 200 to allow processing of the polarimetric radar data.

The polarimetric radar data is provided at Block 240 to a data acquisition unit 272 carried by the second airborne platform 202. As with the single airborne platform 50, the illustrated data acquisition unit 272 is included within a processor 270 coupled to the receiver 258. Alternatively, the data acquisition unit 272 may be configured as a memory 75 external the processor 270 within the second airborne platform 202.

The polarimetric radar data is processed by a data processing unit 274 at Block 242 based upon at least one polarimetric feature to thereby detect an oil mass covered by the ice. As with the single airborne platform 50, the data processing unit 274 may be within the processor 270 carried by the second airborne platform 202, or alternatively, the data processing unit may be replaced or supplemented by a data processing unit 332 at the command and control processing center 330.

RF sounding may also be used to adjust an operating frequency of the transmitter 257 based on the environmental conditions in the search area 280. RF sounding allows characteristics of the ice 284 to be determined at Block 244. Based on the determined characteristics of the ice 284, such as thickness and salinity, the operating frequency of the transmitter 257 is adjusted at Block 246. The method ends at Block 248.

As discussed above, a forward scatter operation is performed between the first and second platforms 200, 202 to detect an oil mass 286 covered by ice 284. Another forward scatter operation may be performed between the first and second platforms 200, 202 when the second airborne platform 202 further includes a transmitter and the first airborne platform 200 further includes a receiver. Operation of the further transmitter and receiver is similar to operation of the above discussed transmitter 257 and receiver 258, and this need no further discussion herein.

Another aspect of detecting an oil mass covered by ice is based on the use of radiometric volumetric data. As will be discussed in greater detail below, radiometric volumetric data advantageously allows an oil mass to be reliably detected within the search area when covered by ice. Once an oil mass is detected, its size and volume may be determined based on the radiometric volumetric data.

Figure 8:
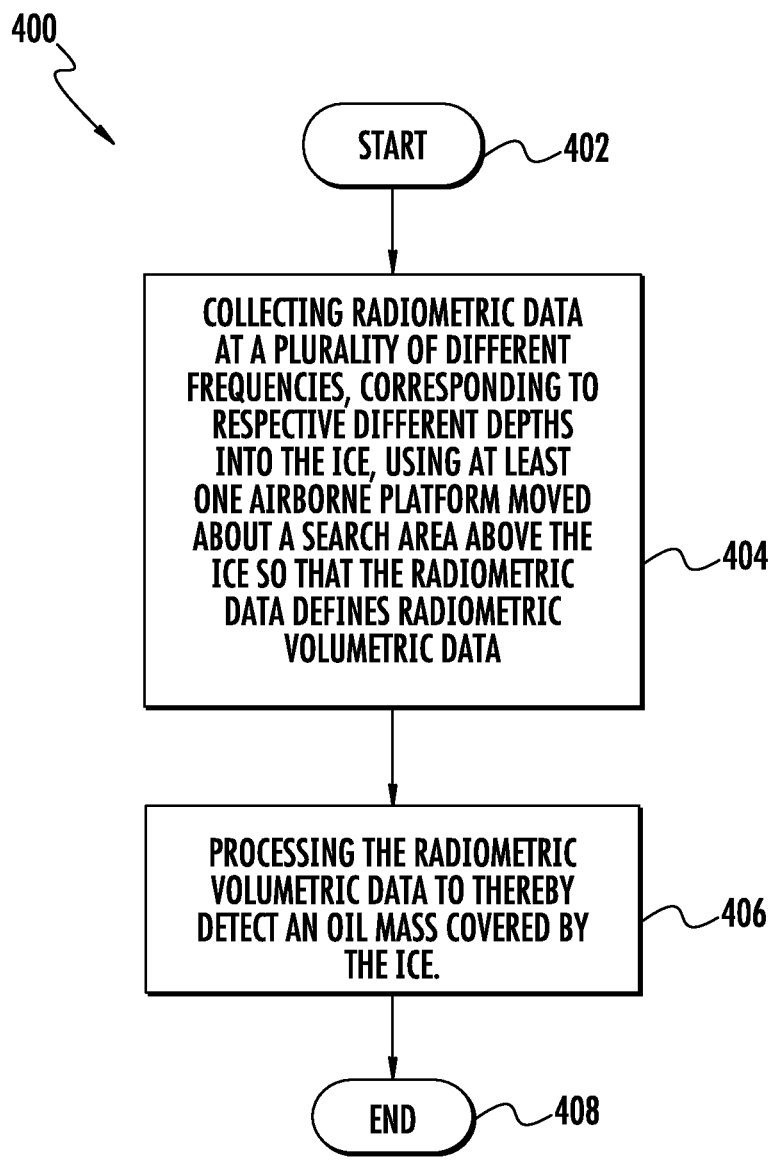
FIG. 8 is a flow chart for a method for detecting an oil mass covered by ice using radiometric volumetric data in accordance with the present invention.

Referring initially to the flowchart 400 in FIG. 8, a method for detecting an oil mass covered by ice includes, from the start (Block 402), collecting radiometric data at Block 404 at a plurality of different frequencies, corresponding to respective different depths into the ice, using at least one airborne platform moved about a search area above the ice so that the radiometric data defines radiometric volumetric data. The radiometric volumetric data is processed at Block 406 to thereby detect an oil mass covered by the ice. The method ends at Block 408.

Figure 9:
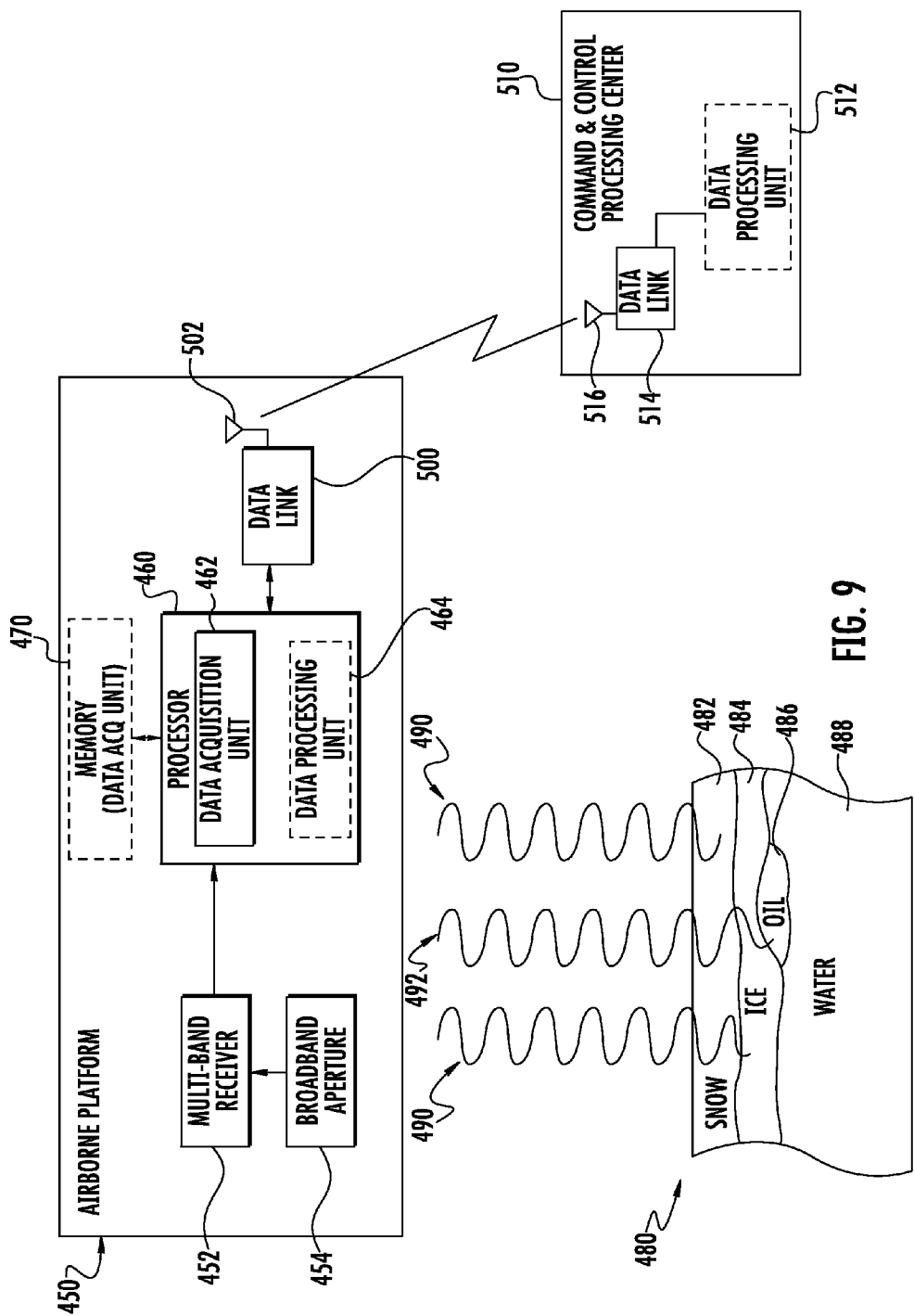
FIG. 9 is a schematic block diagram of a system with a passively operated multi-band receiver for detecting an oil mass covered by ice using radiometric volumetric data metric radar data in accordance with the present invention.
Figure 10:
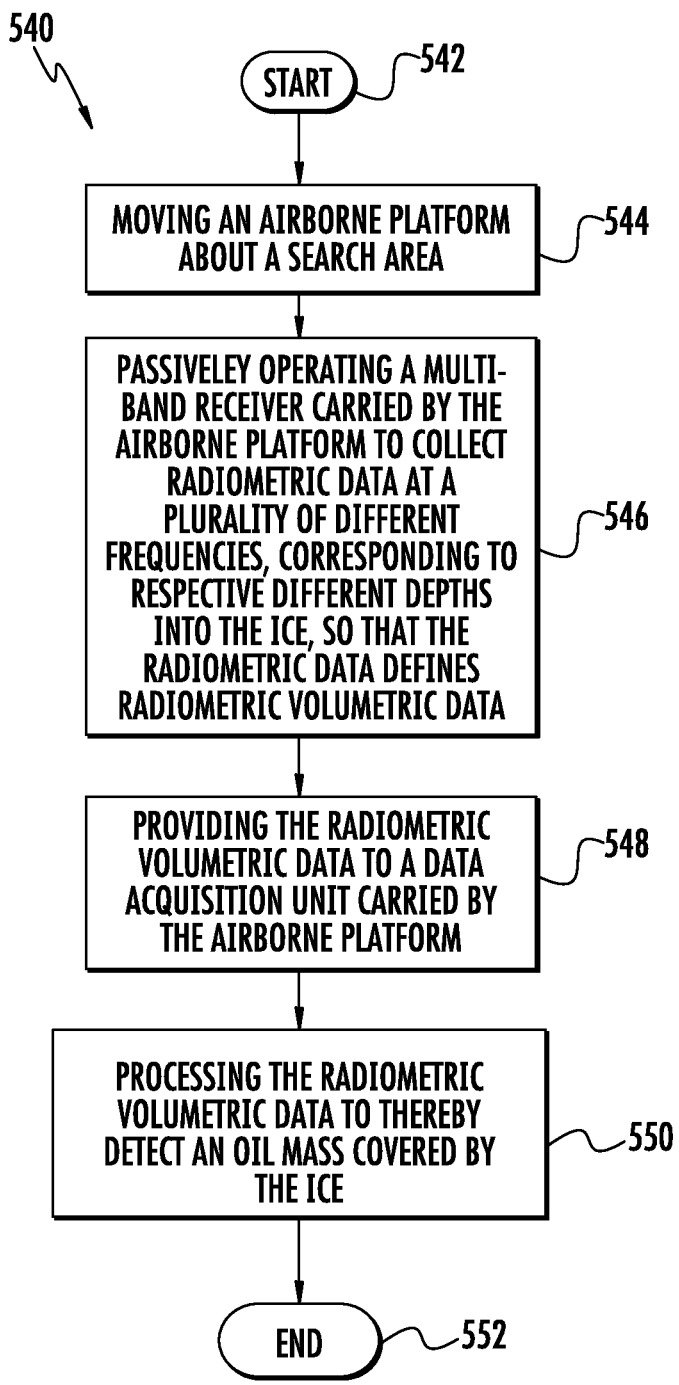
FIG. 10 is a flow chart illustrating a method for detecting an oil mass under ice using the system with the passively operated multi-band receiver illustrated in FIG. 9.

In one embodiment, an airborne platform 450 with a multi-band receiver 452 is passively operated to collect the radiometric volumetric data, as illustrated in FIG. 9. In greater detail, a corresponding method of detecting an oil mass 486 covered by ice 484 using radiometric volumetric data is described with additional reference to the flow chart 540 in FIG. 10. From the start (Block 542), the airborne platform 450 is moved about a search area 480 at Block 544. The airborne platform 450 includes a multi-band receiver 452 and a broadband aperture 454 coupled thereto. The airborne platform 450 is about 100 feet above the ice 484, for example.

The multi-band receiver 452 is passively operated at Block 546 to collect radiometric data at different frequencies, corresponding to respective different depths into the ice 484, so that the radiometric data defines radiometric volumetric data. Multi-band radiometry advantageously takes advantage of energy differences in RF signatures of black-body radiations with respect to an oil mass and ice to reliably detect an oil mass covered by ice.

The multi-band receiver 452 is configured to operate over a range of 30 MHz to 8 GHz, for example. Based on IEEE frequency band designations, 30 MHz to 8 GHz corresponds to the following designations: VHF (30-300 MHz), UHF (300-1000 MHz), L-band (1-2 GHz), S-band (2-4 GHz) and C-band (4-8 GHz). Determining a depth of the oil mass is advantageously exploited based on the different penetration depths of the RF bands. The operating range may be contiguous, meaning that the multi-band receiver 452 operates at a frequency within each band. In other embodiments, selected bands may not be used so that the multi-band receiver 452 is non-contiguous as will be appreciated by those skilled in the art.

As illustrated in FIG. 9, the ice 484 provides an RF signature 490 having a certain energy level, whereas the oil mass 486 has an RF signature 492 at a higher signature level. This is due the emissivity of the oil mass 486 being greater than the emissivity of the ice 484, as readily appreciated by those skilled in the art.

Figure 11:
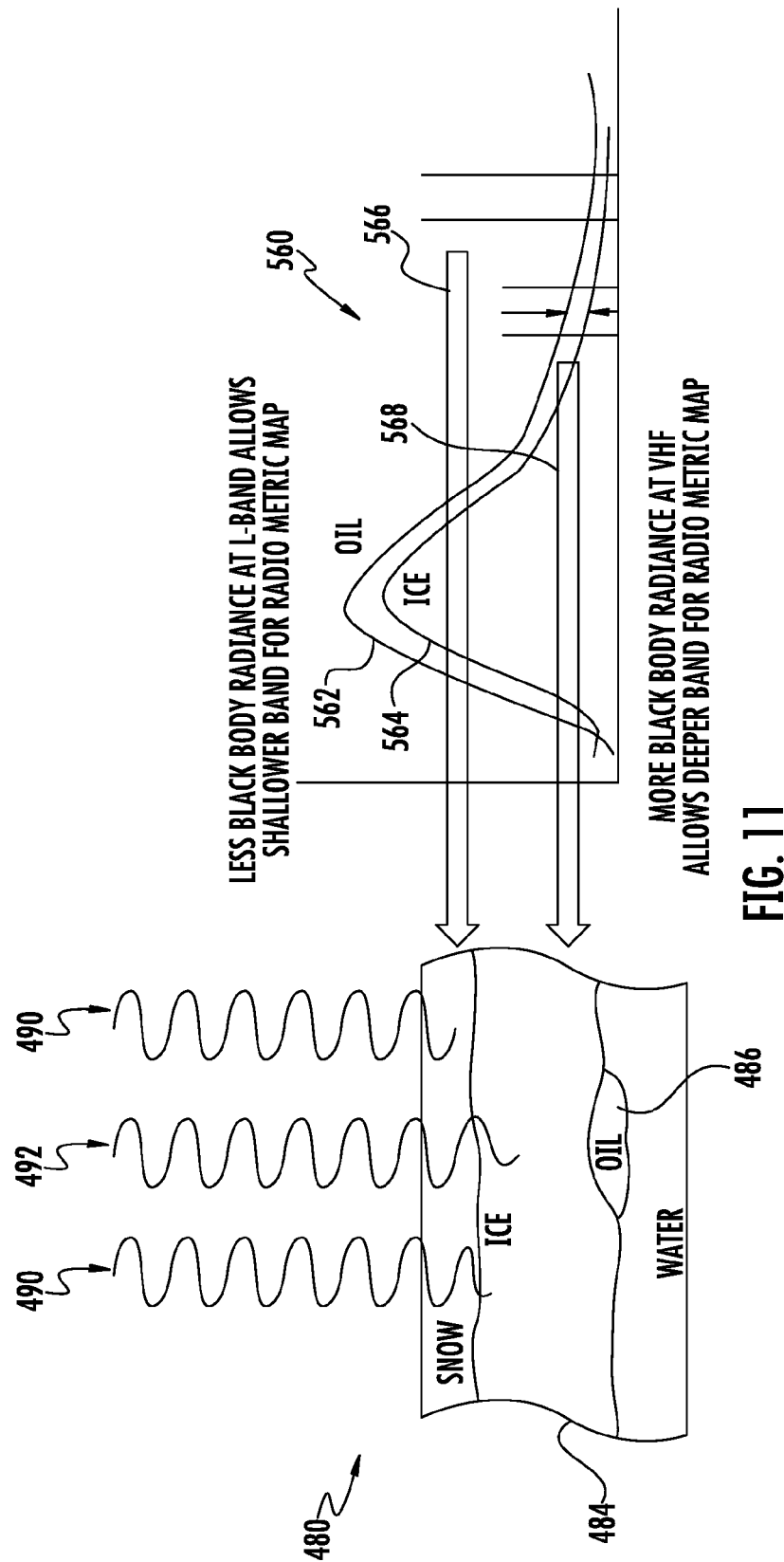
FIG. 11 is a graph illustrating RF spectral signatures for ice and an oil mass at different frequencies with respect to a search area in accordance with the present invention.

A graph 560 illustrating RF spectral signatures for ice and an oil mass at different frequencies with respect to the search area 480 is provided in FIG. 11. Curve 562 corresponds to the oil mass 486 and curve 564 corresponds to the ice 484. Reference 566 corresponds to L-band, whereas reference 568 corresponds to VHF. As illustrated, less black body radiance at L-band allows for a shallower band when creating a radiometric map. In contrast, there is more black body radiance at VHF which allows for a deeper band when creating the radiometric map.

Figure 12:
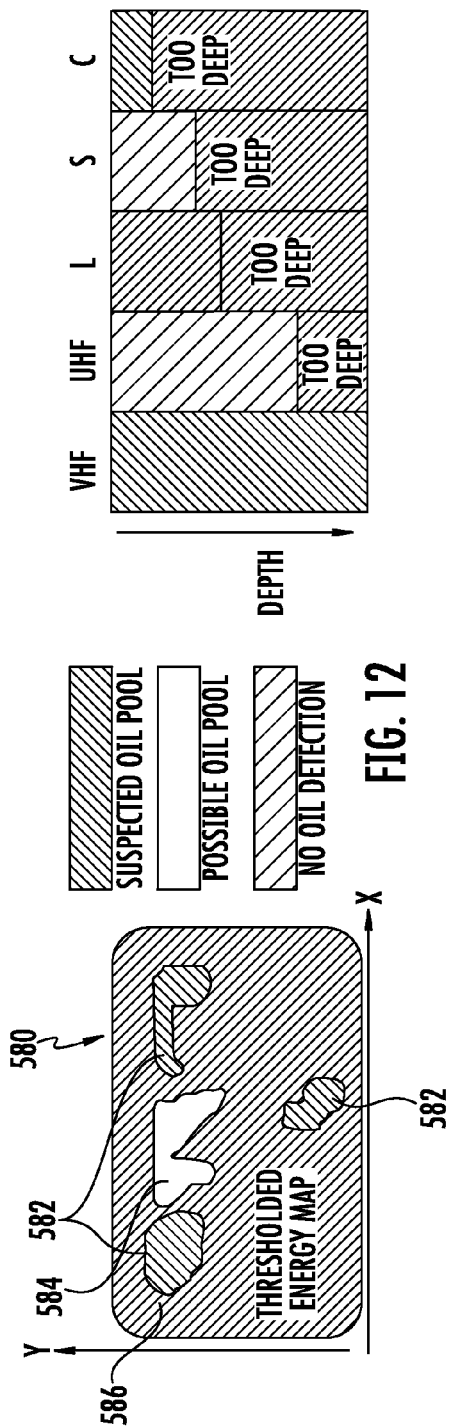
FIG. 12 is an energy map of the search area reflecting operation of the passively operated multi-band receiver in FIG. 9 at different frequencies.

An energy map 580 of the search area 480 reflecting operation of the passively operated multi-band receiver 452 will now be discussed with reference to FIG. 12. The x-y coordinates of the energy map 580 are based on overlapping energy maps of each individual frequency band. For example, suspected oil pools 582 in the energy map 580 are a result of a VHF energy map. Possible oil pool 584 in the energy map 580 is a result of an UHF energy map. The remaining area 586 represents no oil detection and is a result of an L-band energy map. The energy maps associated with S-band and C-band also did not indicate any oil detection.

The radiometric volumetric data is provided to a data acquisition unit 462 carried by the airborne platform 450 at Block 548. The illustrated data acquisition unit 462 is included within a processor 460 coupled to the multi-band receiver 452. Alternatively, the data acquisition unit 462 may be configured as a memory 470 external the processor 460 within the airborne platform 450.

The radiometric volumetric data is processed at Block 550 by a data processing unit 464. The data processing unit 464 may be within the processor 460 carried by the airborne platform 450, or alternatively, the data processing unit may be external the airborne platform 450. In this configuration, the data processing unit 512 is at a command and control processing center 510.

Radiometric volumetric data from the data acquisition unit 462 may be provided to the data processing unit 512 at the command and control processing center 130 via a data link 500. The data link 500 includes an antenna 502 coupled thereto. The command and control processing center 510 includes a corresponding data 514 with an antenna 516 coupled thereto. Alternatively, the radiometric volumetric data is on a removable medium that is physically inserted into the data processing unit 512 at the command and control processing center 510.

Figure 13:
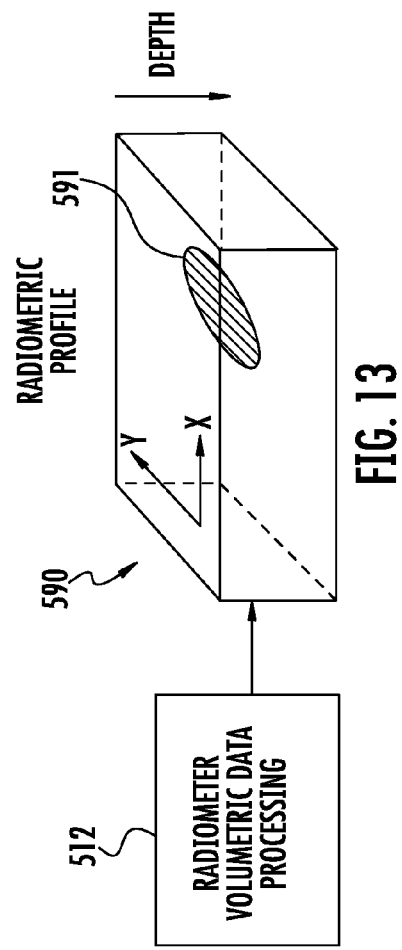
FIG. 13 is a schematic diagram of a 3-dimensional visualization of an oil mass based on combined x-y-depth information data in accordance with the present invention.

Processing of the radiometric volumetric data by the data processing unit 512 collected at the different frequencies defines a combined x-y-depth profile that may advantageously provide a 3-dimensional visualization of the oil mass 486 covered by the ice 484, as perhaps best illustrated by the radiometric profile 590 in FIG. 13. Reference 591 represents the detected oil mass 486.

Operation of the multi-band receiver 452 may be performed over a predetermined dwell time for a given location. This advantageously allows a sufficient energy level to be received so as to more accurately process the radiometric volumetric data. The processing may further include processing based upon at least one polarization characteristic of the radiometric volumetric data. Energy detectors for each band may be used to provide soft decisions (multiple thresholds) for inferring oil detection confidence between an oil/ice mixture and an ice/water column that is passively interrogated.

The multi-band receiver 452 may be operated at a plurality of different times, which allows the processing to further include using change detection based upon the plurality of different times to detect the oil mass covered by the ice. The method ends at Block 552.

The airborne platform 450 may be piloted by a human, or it may be remote controlled via the data link 514 at the command and control processing center 510. In yet other alternative embodiments, the airborne platform 450 may be autonomously controlled, such as a lighter-than-air aircraft intended to hover over the search area 480 for extended periods of time.

The multi-band receive 452 may be configured with a separate receiver for each frequency band. The broadband aperture 454 may be a single aperture with a number of different feeds corresponding to the different frequency bands. Alternatively, separate antennas may be used in lieu of the broadband aperture 454. As a further alternative, the broadband aperture 454 may be configured as a phased array.

Figure 14:
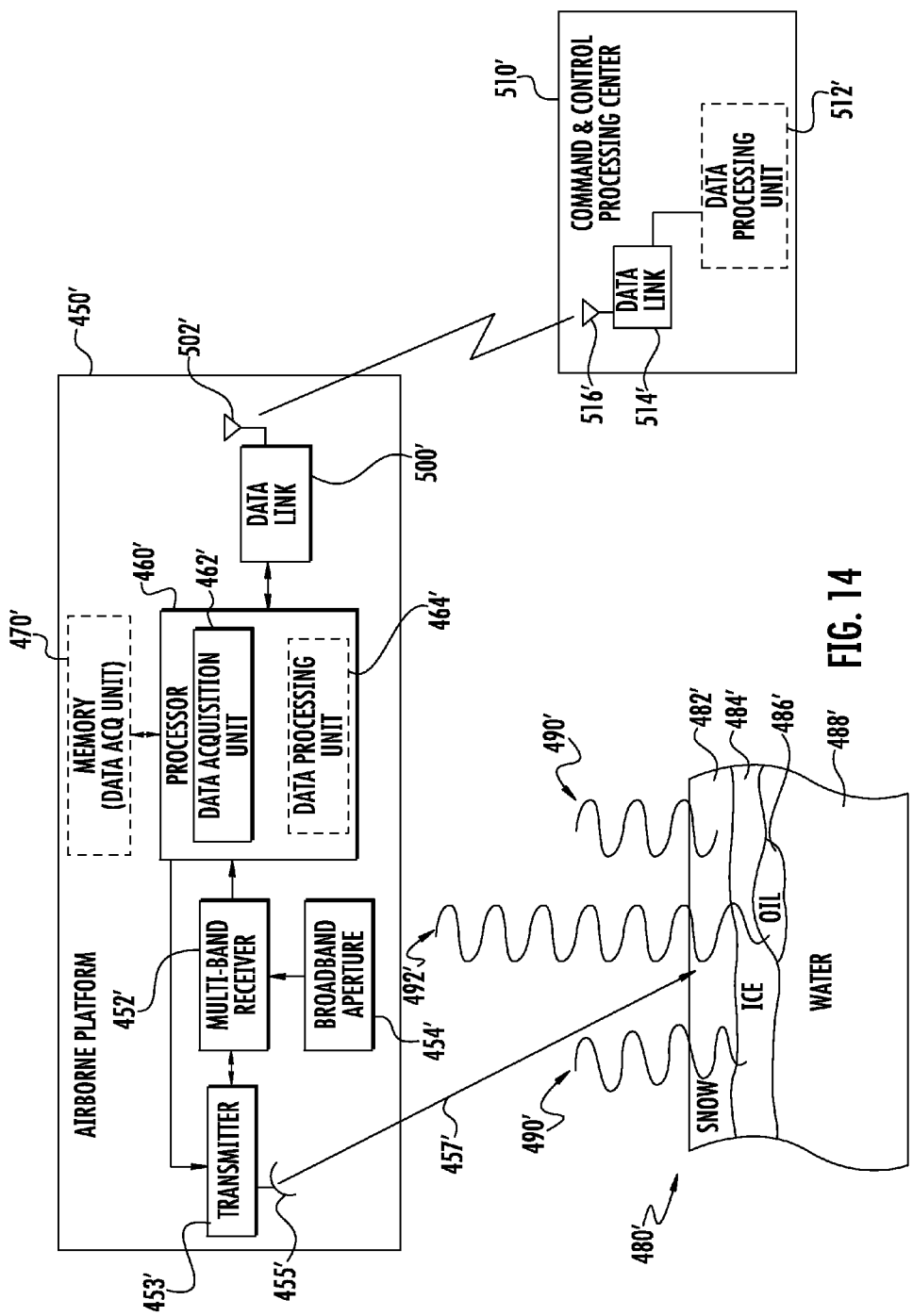
FIG. 14 is a schematic block diagram of a system with an actively operated multi-band receiver for detecting an oil mass covered by ice using radiometric volumetric data metric radar data in accordance with the present invention.
Figure 15:
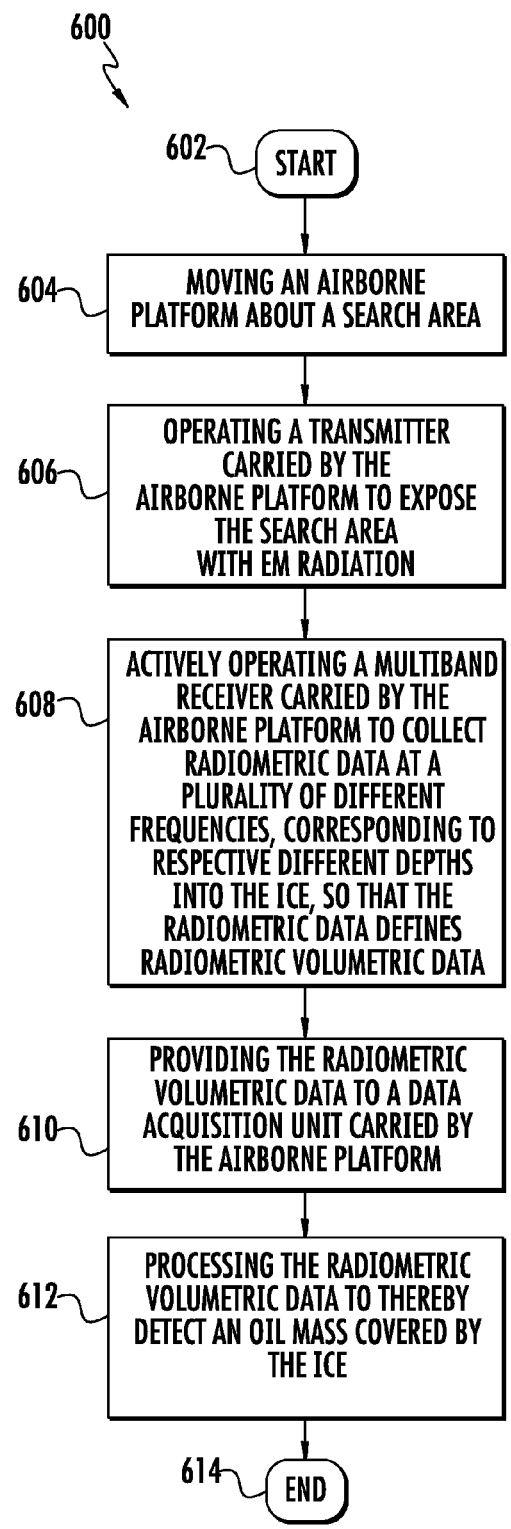
FIG. 15 is a flow chart illustrating a method for detecting an oil mass under ice using the system with the actively operated multi-band receiver illustrated in FIG. 14.

Another aspect of detecting an oil mass covered by ice using radiometric volumetric data includes an actively operated multi-band receiver 452', as illustrated in FIG. 14. A transmitter 453' and an antenna 455' coupled thereto is carried by the airborne platform 450'. In greater detail, a corresponding method of detecting an oil mass 486' covered by ice 484' using radiometric volumetric data is provided by the flow chart 600 in FIG. 15.

From the start (Block 602), the airborne platform 450' is moved about a search area 480'. A transmitter 453' carried by the airborne platform 450' is operated at Block 606 to expose the search area 480' with EM radiation. The search area 480' is exposed to EM radiation having a frequency resonant with the oil 486'. This advantageously allows a stronger energy signature for the oil mass 486' to be detected. The EM radiation may have a frequency in a range of 8 MHz to 30 MHz, for example.

The multi-band receiver 452' is actively operated at Block 608 to collect radiometric data at a plurality of different frequencies, corresponding to respective different depths into the ice, so that the radiometric data defines radiometric volumetric data. The radiometric volumetric data is provided to a data acquisition unit 462' carried by the airborne platform 450' at Block 610. The radiometric volumetric data is processed at Block 610 to thereby detect an oil mass 486' covered by the ice 484'. The method ends at Block 612.

Another aspect of detecting an oil mass covered by ice is based on using coordinated airborne and ground platforms to provide a very high probability of detection at a particular location. Once an oil mass is detected, then appropriate remedial action may be taken. Since the probability of detection is very high, time and cost are not wasted on false alarms.

Figure 16:
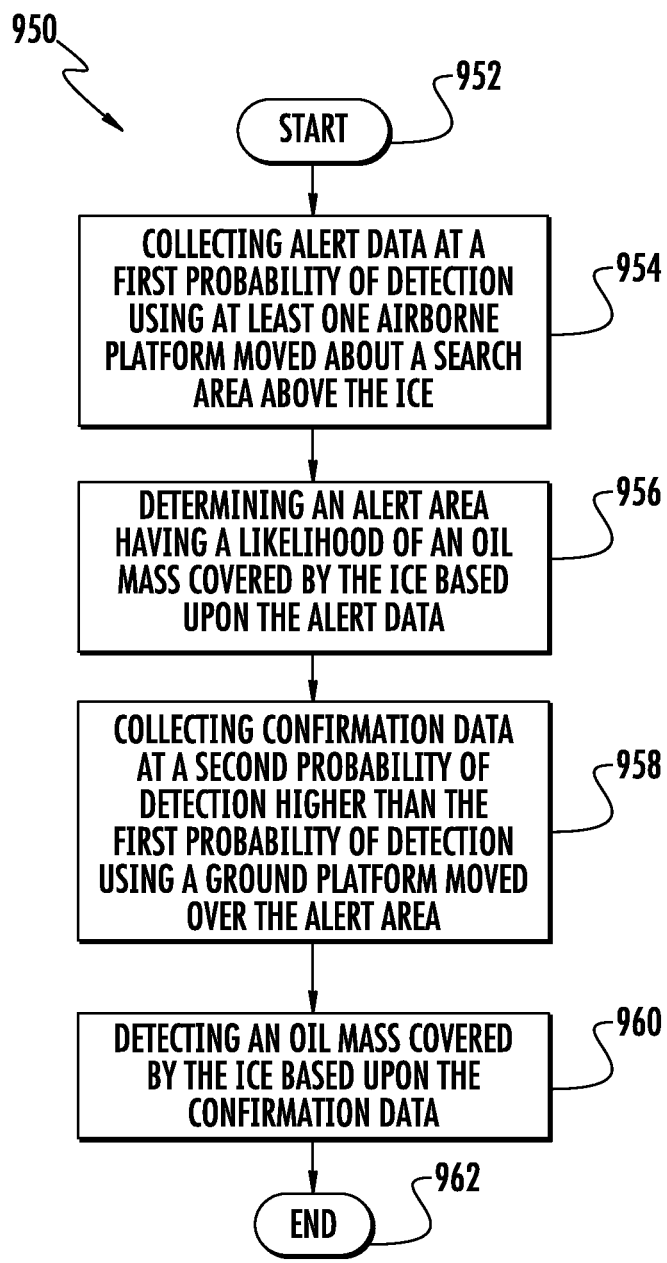
FIG. 16 is a flow chart for a method for detecting an oil mass covered by ice using coordinated airborne and ground platforms in accordance with the present invention.
Figure 17:
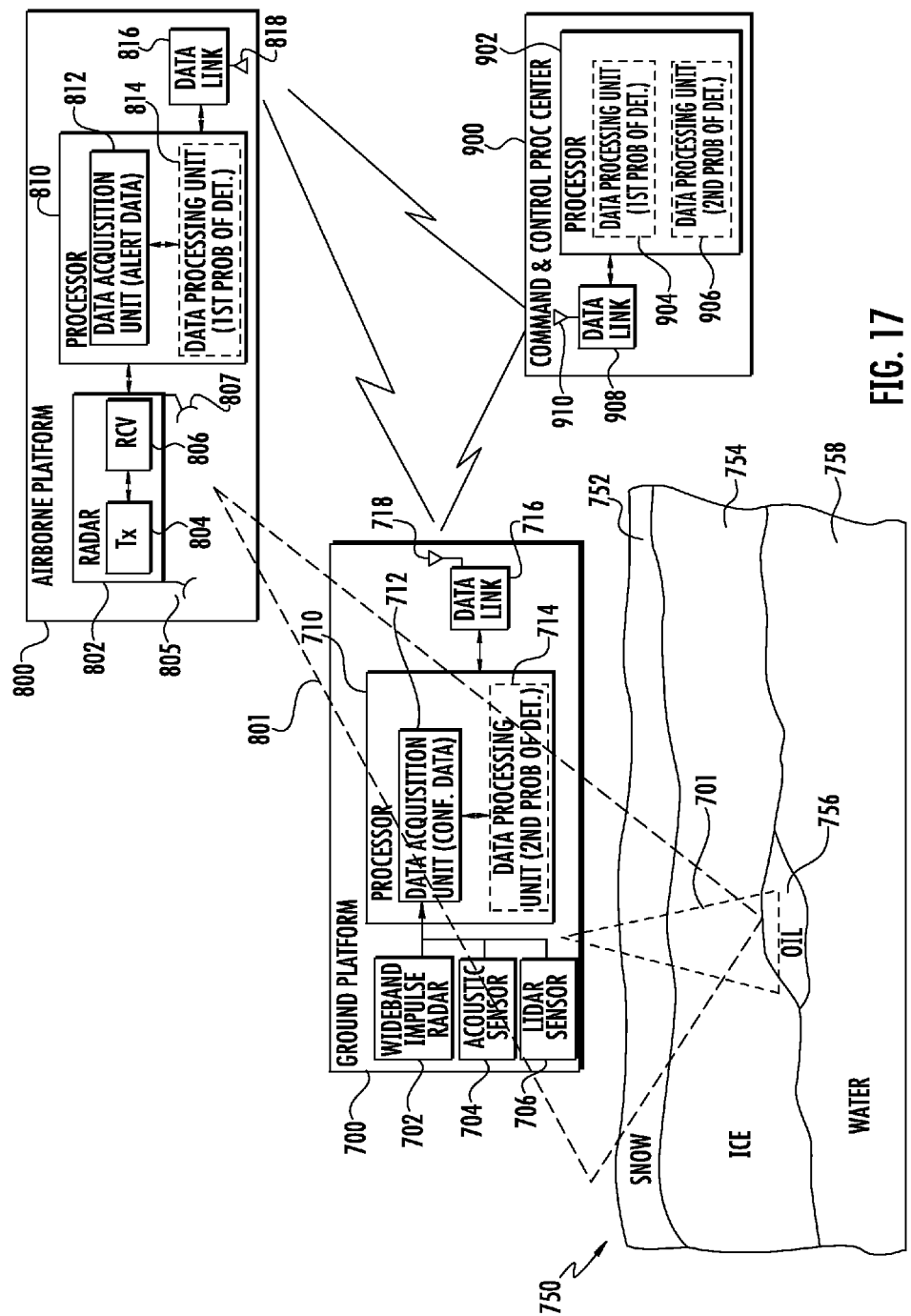
FIG. 17 is a schematic block diagram of a system using coordinated airborne and ground platforms for detecting an oil mass covered by ice in accordance with the present invention.

Referring now to FIGS. 16 and 17, a flowchart 950 and corresponding system for detecting an oil mass 754 covered by ice 752 using coordinated ground and airborne platforms 700, 800 will be discussed. From the start (Block 952) in the flow chart 950, alert data is collected at Block 954 at a first probability of detection using at least one airborne platform 800 moved about a search area 750 above the ice 754. An alert area outlined by cone 801 is determined at Block 956 having a likelihood of an oil mass 756 covered by the ice 754 based upon the alert data.

Confirmation data is collected at Block 958 at a second probability of detection higher than the first probability of detection using a ground platform 700 moved over the alert area 801. An oil mass 756 covered by the ice 754 is detected at Block 960 based upon the confirmation data. A confirmation area outlined by cone 701 is within the alert area 801. The method ends at Block 962.

The airborne platform 800 includes a radar 802. The radar 802 includes a transmitter 804 and a receiver 806. Spaced apart transmit and receive antennas 805, 807 are respectively coupled to the transmitter and receiver 804, 806. Alert data collected by the radar 802 is provided to a data acquisition unit 812. The illustrated data acquisition unit 812 is included within a processor 810 coupled to the radar 802.

The alert data is provided to a data processing unit 814 that may also be included within the processor 810. The data processing unit 814 determines the alert area having a likelihood of an oil mass covered by the ice based upon the alert data. This is performed having a first probability of detection. A data link 816 having an antenna 818 coupled thereto interfaces with the processor 810.

The illustrated ground platform 700 includes a wideband impulse radar 702, an acoustic radar sensor 704 and a LIDAR sensor 706 to collectively provide the confirmation data to a data acquisition unit 712. The data acquisition unit 712 is within a processor 710 within the ground platform 700.

Information on the alert area as determined by the airborne platform 800 is provided to the ground platform 700 via data links 716, 816. In particular, a contour map of the surface of the alert area is provided to the ground platform 700. Since the ground platform 700 is mobile, the contour map is advantageously used to avoid cracks and crevices that may cause the ground platform to become stuck or turned over on its side.

The confirmation data is provided to a data processing unit 714 that may also be included within the processor 710. The data processing unit 714 determines the oil mass 756 covered by the ice 754 based upon the confirmation data. The data processing unit 714 has a second probability of detection higher then the first probability of detection. A data link 716 having an antenna 718 coupled thereto interfaces with the processor 710.

In lieu of the data processing unit 814 determining the alert area in the airborne platform 800 and the data processing unit 714 determining the oil mass 756 in the ground platform 700, the respective data used for this processing may be transmitted via data links 816, 716 to a command and control processing center 900.

The command and control processing center 900 includes a processor 902 performing these functions via a data processing unit 904 and data processing unit 906. A data link 908 with an antenna 910 coupled interfaces with the processor 902 for providing the collected alert data received via data link 816 at the airborne platform 800, and the collected confirmation data received via data link 716 at the ground platform 700.

In one embodiment, the ground platform 700 is manned and the airborne platform 800 is unmanned. The airborne platform 800 is controlled by the command and control processing center 900 via the data links 908, 816. In another embodiment, the airborne platform 800 is manned, and the ground platform 700 is unmanned. The ground platform 700 is controlled by the command and control processing center 900 via the data links 908, 716. In yet another embodiment, both the ground and airborne platforms 700, 800 are unmanned and are controlled by the command and control processing center 900.

The radar 802 within the airborne platform may be a synthetic-aperture radar (SAR). Alternatively, the radar 802 may be a circular polarization diversity synthetic-aperture radar data. The Circular Polarization Ratio (CPR) will be used to distinguish between returns from ice and oil deposits in ice.

The first probability of detection may be less than or equal to 80%, and the second probability of detection may be greater than or equal to 99%. In addition, the insulator characteristics of the oil mass 756 will produce a capacitive effect similar top a parallel-plate capacitor when interrogated by an RF electromagnetic field. The equivalent RC circuit ringing depends on a size of the oil mass 756 (i.e., area and volume) and penetration of the RF signal. A time constant RC determines a ringing duration, as readily appreciated by those skilled in the art.

The various different oil detection techniques as described herein may be used individually or may be combined with one another as will be appreciated by those skilled in the art. In addition, many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A method for detecting an oil mass covered by ice comprising:

collecting radiometric data at a plurality of different frequencies corresponding to respective different depths into the ice, using an electromagnetic (EM) radiation receiver carried by an airborne platform moved about a search area above the ice so that the radiometric data defines radiometric volumetric data; and using a processor for processing the radiometric volumetric data, collected at the plurality of different frequencies corresponding to respective different depths into the ice, to define a combined x-y-depth profile representative of a detected oil mass covered by the ice.

2. The method according to claim 1 wherein collecting comprises passively collecting the radiometric volumetric data.

3. The method according to claim 1 further comprising exposing the search area to electromagnetic (EM) radiation so that the collecting comprises actively collecting the radiometric volumetric data.

4. The method according to claim 3 wherein exposing comprises exposing the search area to EM radiation having a frequency resonant with the oil.

5. The method according to claim 3 wherein exposing comprises exposing the search area to EM radiation having a frequency in a range of 8 MHz to 30 MHz.

6. The method according to claim 1 wherein the plurality of different frequencies extend over a range of 30 MHz to 8 GHz.

7. The method according to claim 1 wherein the collecting comprises collecting the radiometric data over a predetermined dwell time for a given location.

8. The method according to claim 1 wherein the processing comprises processing based upon at least one polarization characteristic of the radiometric volumetric data.

9. The method according to claim 1 further comprising collecting the radiometric volumetric data for the search area at a plurality of different times; and wherein the processing further comprises using change detection based upon the plurality of different times for the same search area.

10. The method according to claim 1 wherein the search area comprises a predetermined area around an oil extraction site.

11. The method according to claim 1 wherein the search area comprises a predetermined area around an oil pipeline site.

12. The method according to claim 1 wherein the at least one airborne platform comprises at least one unmanned airborne platform.

13. A method for detecting an oil mass covered by ice using radiometric data collected at a plurality of different frequencies, corresponding to respective different depths into the ice, using an electromagnetic (EM) radiation receiver carried by an airborne platform moved about a search area above the ice so that the radiometric data defines radiometric volumetric data, the method comprising:

using a processor for processing the radiometric volumetric data, collected at the plurality of different frequencies corresponding to respective different depths into the ice, to define a combined x-y-depth profile representative of a detected oil mass covered by the ice.

14. The method according to claim 13 wherein the radiometric volumetric data is collected passively.

15. The method according to claim 13 wherein the radiometric volumetric data is actively collected.

16. The method according to claim 13 wherein the plurality of different frequencies extend over a range of 30 MHz to 8 GHz.

17. The method according to claim 13 wherein the processing comprises processing based upon at least one polarization characteristic of the radiometric volumetric data.

18. The method according to claim 13 wherein the radiometric volumetric data for the search area is collected at a plurality of different times; and wherein the processing further comprises using change detection based upon the plurality of different times for the same search area.

19. A system for detecting an oil mass covered by ice comprising:

at least one airborne platform comprising an electromagnetic (EM) radiation receiver configured to collect radiometric data at a plurality of different frequencies corresponding to respective different depths into the ice, as the at least one airborne platform moves about a search area above the ice so that the radiometric data defines radiometric volumetric data; and a processor and a memory coupled thereto configured to process the radiometric volumetric data, collected at the plurality of different frequencies corresponding to respective different depths into the ice, to define a combined x-y-depth profile representative of a detected oil mass covered by the ice.

20. The system according to claim 19 wherein said at least one airborne platform is configured to passively collect the radiometric volumetric data.

21. The system according to claim 19 wherein said at least one airborne platform is configured to expose the search area to electromagnetic (EM) radiation so as to actively collect the radiometric volumetric data.

22. The system according to claim 21 wherein said at least one airborne platform is configured to expose the search area to EM radiation having a frequency resonant with the oil.

23. The system according to claim 22 wherein said at least one airborne platform is configured to expose comprises exposing the search area to EM radiation having a frequency in a range of 8 MHz to 30 MHz.

24. The system according to claim 19 said at least one airborne platform is configured to collect the radiometric volumetric data over a predetermined dwell time for a given location.

25. The system according to claim 19 wherein said processor is configured to process based upon at least one polarization characteristic of the radiometric volumetric data.

26. The system according to claim 19 wherein said at least one airborne platform is configured to collect the radiometric volumetric data for the search area at a plurality of different times; and wherein said processor is configured to process the radiometric volumetric data using change detection based upon the plurality of different times for the same search area.

* * * * *